United States Patent

Brown, Jr.

[15] 3,677,140
[45] July 18, 1972

[54] HYDRAULIC BOOSTER WITH SAFETY DEVICE

[72] Inventor: Arthur K. Brown, Jr., South Bend, Ind.
[73] Assignee: The Bendix Corporation
[22] Filed: Nov. 23, 1970
[21] Appl. No.: 92,058

[52] U.S. Cl....................................91/391, 91/434, 91/469
[51] Int. Cl.............................................F15b 13/10
[58] Field of Search...................60/54.6 P; 91/391, 434, 469

[56] References Cited

UNITED STATES PATENTS 3,173,339  3/1965  Larsen.....................................91/434

FOREIGN PATENTS OR APPLICATIONS 1,105,351  3/1968  Great Britain..........................91/391

Primary Examiner—Paul E. Maslousky
Attorney—Ken C. Decker and Plante, Hartz, Smith & Thompson

[57] ABSTRACT

A hydraulic brake booster is disclosed which includes a spool valve slidably mounted within the booster housing to control fluid communication between a source of hydraulic pressure and the booster pressure chamber. A secondary valve mechanism is slidably mounted on the end of the spool valve which closes when the vehicle operator effects a brake application and the spool valve fails to move. Closure of the secondary valve prevents a surge of hydraulic fluid from being communicated into the booster pressure chamber, should the spool valve move after a manual brake application has been initiated. A stop piston, which is slidably mounted in the booster housing, engages the other end of the spool valve and cooperates with the secondary valve mechanism to prevent the latter from closing upon actuation of the spool valve if the fluid pressure level at the inlet of the booster is below a predetermined level. This feature permits hydraulic fluid to be communicated into the booster pressure chamber as soon as the vehicle's engine is started to assist the vehicle operator in applying the brakes of the vehicle.

10 Claims, 1 Drawing Figure

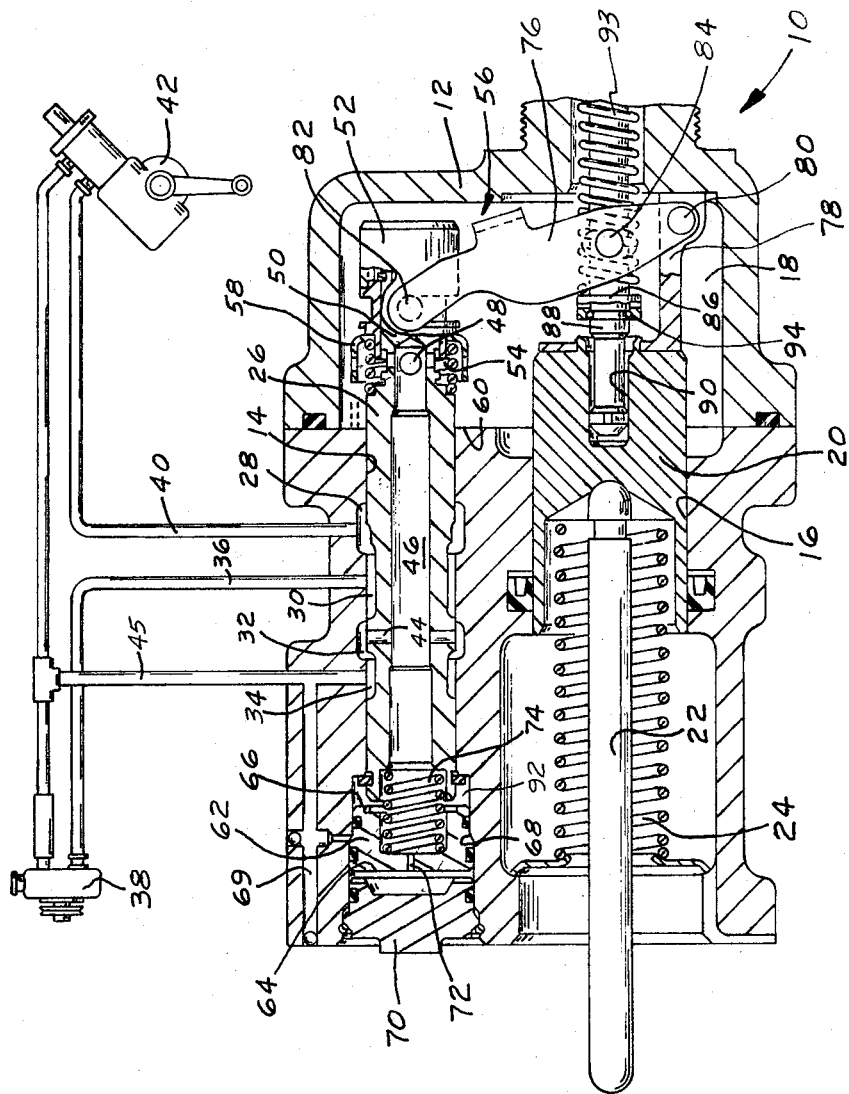
PATENTED JUL 18 1972
3,677,140
INVENTOR.
ARTHUR K. BROWN JR.
BY Ken C. Decker
ATTORNEY

3,677,140

HYDRAULIC BOOSTER WITH SAFETY DEVICE

BACKGROUND OF THE INVENTION

This invention relates to a hydraulic brake booster.

A common hydraulic brake booster device includes a spool valve slidably mounted within a housing which controls fluid communication between a hydraulic pressure source, such as the vehicle's power steering pump, and the booster pressure chamber. The spool valve is actuated when the vehicle operator effects a brake application. Although the spool valve mechanism generally works quite well, it does occasionally malfunction in such a manner that the spool valve does not move when the vehicle operator actuates the vehicle's brakes. If the spool valve should suddenly move after a manual brake application has been initiated, an abrupt surge of hydraulic pressure is communicated into the booster pressure chamber, thereby applying the vehicle's brakes very quickly. In order to correct this very dangerous situation, a secondary valve mechanism is provided on the spool valve that closes whenever a manual brake application is initiated. Such a device is disclosed in U. S. Pat. Ser. No. 38,087, filed May 18, 1970, now U.S. Pat. No. 3,610,102, owned by the assignee of the present invention and incorporated herein by reference. However, the secondary valve mechanism described in the aforementioned application requires that the vehicle operator release and then reapply the vehicle's brakes in order to obtain a power assist when the operator starts the vehicle's engine with his foot on the brake pedal. Since the vehicle's brakes must be applied manually if the vehicle's engine dies while the vehicle is descending a steep grade when the booster disclosed in the aforementioned application is used, it is very desirable that this dangerous situation be eliminated by insuring that a power assist is provided as soon as the vehicle's engine is restarted.

SUMMARY OF THE INVENTION

Therefore, an important object of my invention is to provide a brake booster which provides a power assist to the vehicle operator whenever the brakes of the vehicle are applied when the vehicle's engine is operating.

Another important object of my invention is to provide a hydraulic brake booster in which a power assist is provided to the vehicle operator when the vehicle's engine is started even if the operator starts the engine with his foot on the brake pedal.

DESCRIPTION OF THE DRAWINGS

The sole FIGURE of the drawings is a schematic illustration of a vehicle hydraulic system with the brake booster made pursuant to the teachings of my present invention illustrated in cross section.

DETAILED DESCRIPTION

Referring now to the drawings, a brake booster generally indicated by the numeral 10 includes a housing 12 defining a first bore 14, a second bore 16 and pressure chamber 18 therewithin. A piston 20 is slidably mounted in the bore 16, and one end of the piston 20 projects into the chamber 18. A rod 22 engages the other end of the piston 20 and interconnects the latter with a standard automotive master cylinder (not shown) mounted to the left of the housing 12, viewing the figure. A return spring 24 yieldably urges the piston 20 to the right viewing the figure, toward the brake release position.

A spool valve 26 is slidably mounted in the bore 14 and is provided with spaced recesses and projections that cooperate with corresponding recesses and projections in the wall of the bore 14 to define annular fluid cavities 28, 30, 32 and 34 therebetween. An inlet port 36 communicates the cavity 30 with the high pressure side or outlet of a power steering pump 38. An outlet port 40 communicates the cavity 28 with the inlet of a power steering gear 42. A return or exhaust port 44 communicates the cavity 34 with the low pressure side or inlet of the pump 38. The outlet of the power steering gear 42 is also communicated with the inlet of the pump 38. The spool valve 26 is also provided with radially extending passages 44 and an axially extending passage 46. The end of the spool valve 26 which projects into the pressure chamber 18 has a reduced diameter portion 50 through which openings 48 extend. A secondary valve mechanism or cap member 52 is slidably mounted on the reduced diameter portion 50 of the spool valve 26 and is shiftable from a first position (illustrated in the drawing) permitting fluid communication through the openings 48 to a second position in which the cap member closes the openings 48, thereby preventing fluid communication from the passage 46 into the pressure chamber 18. A spring 54 yieldably urges the cap member 52 toward the first position.

Operator-operated means generally indicated by the numeral 56 is pivotally connected to the cap member 52 for shifting the spool valve 26 from a first position (illustrated in the drawing) in which fluid communication between the cavities 30 and 32, and therefore into the pressure chamber 18, is prevented and substantially all of the fluid flowing into the inlet 36 is communicated directly to the outlet 40, to a second position in which a portion of the fluid flowing into the inlet port 36 is communicated to the cavity 32 and therefore into the pressure chamber 18 through the passages 44 and 46 and the openings 48. Details of the construction and operation of the spool valve 26 are more completely described in copending U. S. Pat. application Ser. No. 13,415, filed Feb. 24, 1970, owned by the assignee of the present invention incorporated herein by reference. The cap member 52 is provided with a shroud 58 that is adapted to engage the surface 60 on the housing 12 to prevent the cap member 52 from closing the openings 48 after the spool valve 26 is shifted past the second position even though sufficient force is applied to the cap member 52 to collapse the spring 54.

A stop piston 62 is slidably mounted in the bore 14 and is adapted to engage the other end of the spool valve 26. The piston 62 is stepped to define a larger diameter face 64 and a smaller diameter face 66 with a shoulder 68 therebetween. The larger and smaller faces 64 and 66 are slidably received in correspondingly shaped portions of the bore 26. The piston 62 is slidable from a first condition (illustrated in the drawing) in which the shoulder 68 on the piston 62 engages the corresponding shoulder in the wall of the bore 14 to a second condition in which the face 64 of the piston 62 engages the end closure 70 of the bore 14. An orifice 72 extends through the piston 62 to communicate hydraulic fluid from one side of the piston to the other. A spring 74 is disposed between the piston 62 and the other end of the spool valve 26, yieldably urging the latter towards its first or brake release position, and yieldably urging the piston 62 towards its first position.

Operator-operated means 56 includes lever means 76, one end of which is connected to a bracket 78 carried by the piston 20 by first pivot means 80. The other end of lever means 76 is connected to the cap member 52 by second pivot means 82. A third pivot 84 connects the lever means 76 with a sleeve 86 which telescopically receives an input rod 88. One end of the input rod 88 is slidably supported in a blind bore 90 provided in the piston 20 and the other end of the input rod 88 is connected to the usual brake pedal (not shown) mounted in the operator's compartment of the vehicle. A spring 92 yieldably urges the sleeve 86 into engagement with a stop ring 94 carried on the input rod 88 so that movement of the input rod to the left viewing the figure will pivot the lever means 76 about the first pivot 80.

MODE OF OPERATION

The brake booster 10 is illustrated with the various components disposed in the position they assume when the vehicle's brakes are released. When a brake application is effected, input rod 88 is urged to the left thereby pivoting the lever means 76 about the first pivot 80. Since the spring constant of the spring 54 is much greater than the spring constant of the spring 74, relative movement between the cap member 52 and the spool valve 26 is normally prevented. Therefore, pivoting of the lever means 76 urges the spool valve 26 to the left viewing the figure, from the first position in which substantially all of the fluid flowing into the inlet 36 is communicated through the cavities 30 and 28 to the outlet 40 and the booster chamber 18 is vented to the low pressure side of the pump 38 through the exhaust port 44, to the second position in which communication between the pressure chamber 18 and the exhaust port 44 is terminated and a portion of the fluid flowing into the inlet port 36 is communicated into the pressure chamber 18 through radial passages 44, axial passage 46, and the openings 48. High pressure fluid admitted into the pressure chamber 18 acts upon the right end of the piston 20 to urge the latter to the left viewing the figure. Movement of the piston 20 to the left is transmitted to the master cylinder (not shown) by the rod 22 to develop braking pressure in the master cylinder in the normal manner. When the vehicle operator releases the brake pedal, return springs 24 and 74 urge the piston 20 and the spool valve 26 respectively to the brake release position.

If the spool valve 26 should malfunction and therefore refuse to slide within the bore 14, the higher operator input force required is sufficient to overcome the force of the spring 54 to urge the secondary valve member or cap 52 to the left viewing the figure relative to the spool valve 26. When the cap member 52 is moved fully to the left, fluid communication through the openings 48 is prevented, thereby preventing a sudden admission of fluid into the chamber 18 should the spool valve 26 suddenly move. Simultaneously, the higher operator-applied input force collapses the spring 92 to permit the stop 94 on the rod 88 to move away from the sleeve 86. The end of the operator input rod 88 engages the end of the blind bore 90 to permit the vehicle operator to apply a brake actuating force to the piston 20.

Occasionally, the vehicle's engine must be started while the operator's foot rests on the brake pedal, such as when the vehicle's engine dies while the vehicle is descending a grade. In the device disclosed in the aforementioned application Ser. No. 38,074, the vehicle operator had to release the brake pedal and then reapply the brake after the vehicle's engine is restarted in order to obtain powerassisted braking since the spool valve 26 would be shifted to the second position and the cap member 52 would thereafter close the passage 48. However, this undesirable mode of operation cannot occur with the device disclosed in the present application. If the vehicle's brakes are applied while the power steering pump is inoperative, movement of the input rod 88 shifts the spool valve 26 into engagement with the stop piston 62, and thereafter shifts the spool valve 26 and the stop piston 62 as a unit until the face 64 of the stop piston 62 engages the bore closure member 70. Any further movement of the input rod 52 cannot move the cap member 52 relative to the spool valve 26 since the shroud 58 will engage the surface 60 on the housing 12. On the other hand, if the spool valve 26 refuses to move because of a sticky spool condition, the cap member 52 will move relative to the spool valve 26, since the shroud 58 can only engage a surface 60 after the spool valve 26 has been shifted to the second position.

During normal operation of the booster, high pressure fluid in the passage 46 is communicated into the chamber 92 at the end of the spool valve 26, where it acts on the smaller diameter face 66 of the stop piston 62. Fluid also bleeds through the orifice 72 into the portion of the bore 14 between the face 64 of the piston 62 and the end closure 70. Since face 64 is larger than face 66, high pressure fluid acting on face 64 assures that the shoulder 68 on the stop piston 62 is maintained in engagement with the corresponding shoulder on the housing 12. The cavity defined between the shoulder on the stop piston 62 and the shoulder on the housing 12 is vented to the exhaust port 44 by the passage 69 to assure that a pressure differential will act across the piston 62 to maintain the shoulder 68 on the piston 62 in engagement with the corresponding shoulder on the housing. Movement of the spool valve 26 past the second position is therefore prevented when fluid pressure is communicated into the chamber 93. Therefore, the secondary valve mechanism 52 will close the passages 48 after the spool valve 26 has been shifted to the second position to prevent further fluid communication into the chamber 18. This feature assures that the braking pressure developed in the aforementioned master cylinder will be limited to the maximum safe braking pressure for the vehicle's braking system.

I claim:

1. In a hydraulic brake booster:
a housing having an inlet, an outlet, a pressure chamber, and a bore communicating the inlet and outlet with the pressure chamber;
a spool valve slidably mounted in said bore and shiftable from a first position communicating substantially all of the fluid flowing into the inlet to the outlet to a second position communicating at least a portion of the fluid flowing into the inlet to the pressure chamber;
said spool valve having passage means therewithin to provide a flow path between the inlet and the pressure chamber as the spool valve is shifted from the first position;
operator-actuated means for shifting said spool valve; mechanism interconnecting the spool valve and the operator-actuated means;
said mechanism being movable on said valve to close said passage means upon actuation of the operator-actuated means when movement of the valve is prevented; and
other means within said housing to prevent said mechanism from closing the passage means when the valve is shifted to the second position and the fluid pressure level at the inlet falls below a predetermined level.

2. In a hydraulic brake booster:
a housing having an inlet, and outlet, a pressure chamber, and a bore communicating the inlet and outlet with the pressure chamber;
a spool valve slidably mounted in said bore and shiftable from a first position communicating substantially all of the fluid flowing into the inlet to the outlet to a second position communicating at least a portion of the fluid flowing into the inlet port to the pressure chamber;
stop means in said bore to normally prevent movement of the spool valve past the second position, said stop means yielding to permit movement of the spool valve past the second position when the fluid pressure level at said inlet falls below a predetermined level;
said spool valve having passage means therewithin to provide a flow path between the inlet and the pressure chamber as the spool valve is shifted from the first position;
operator-actuated means for shifting said spool valve; and
mechanism movable on said spool valve to close said passage means upon actuation of the operator-actuated means when movement of the valve is prevented;
said mechanism including auxiliary means preventing said mechanism from closing said passage means upon movement of the spool valve a predetermined distance past said second position.

3. The invention of claim 2:
one end of said spool valve extending into said pressure chamber;
said mechanism including a cap member slidably mounted on said one end and movable to and from a position closing said passage means;
said operator-operated means being connected to said cap member.

4. The invention of claim 3:
said auxiliary means projecting from said cap member for engagement with the wall of the housing when the spool valve is shifted past the second position to prevent said cap member from moving relative to said spool valve.

5. The invention of claim 4:

said auxiliary means being a shroud carried by said cap member.

6. The invention of claim 2:

said stop means being a piston slidably mounted in said bore for engagement with the end of said spool valve to limit movement of the letter;

said piston being slidably from a first condition permitting movement of the spool valve past the second position to a second condition preventing movement of the spool valve past said second position.

7. The invention of claim 6:

said piston being stepped to present larger and smaller diameter faces with a shoulder therebetween;

said smaller face being adapted to engage the end of the spool; and means communicating fluid pressure from said inlet port to said larger face to maintain said piston in said second condition when the fluid pressure level at the inlet exceeds a predetermined level.

8. The invention of claim 7:

said last-mentioned means including an orifice extending through said piston to communicate fluid pressure from said smaller face to the larger face.

9. The invention of claim 2:

one end of said spool valve extending into said pressure chamber;

said mechanism including a cap member slidably mounted on said one end and movable to and from a position closing said passage means;

said stop means being a piston slidably mounted in said bore for engagement with the other end of the spool valve to limit movement of the latter;

said piston being slidable from a first condition permitting movement of the spool valve past the second position to a second condition preventing movement of the spool valve past said second position;

said cap member closing said passage means after movement of the spool valve to the second position with the piston in the second condition.

10. The invention of claim 9:

said auxiliary means projecting from said cap member for engagement with the wall of the housing when the piston is disposed in said second condition to permit movement of the spool valve past the second position, thereby preventing said cap member from moving relative to said spool valve.

\* \* \* \* \*